(12) United States Patent
Wallendorff

(10) Patent No.: US 10,278,378 B1
(45) Date of Patent: May 7, 2019

(54) RODENT TRAP

(71) Applicant: Joseph L. Wallendorff, Excello, MO (US)

(72) Inventor: Joseph L. Wallendorff, Excello, MO (US)

(*) Notice: Subject to any disclaimer, the term of this patent is extended or adjusted under 35 U.S.C. 154(b) by 0 days.

(21) Appl. No.: 15/670,595

(22) Filed: Aug. 7, 2017

(51) Int. Cl.
*A01M 23/10* (2006.01)
*A01M 23/02* (2006.01)
*A01M 23/04* (2006.01)

(52) U.S. Cl.
CPC ............ *A01M 23/10* (2013.01); *A01M 23/02* (2013.01); *A01M 23/04* (2013.01)

(58) Field of Classification Search
CPC ............................ A01M 23/10; A01M 23/02
USPC ........................................ 43/71, 72, 64, 74
See application file for complete search history.

(56) References Cited

U.S. PATENT DOCUMENTS

| | | | | |
|---|---|---|---|---|
| 710,020 A * | 9/1902 | Short | ..................... | A01M 21/00 43/65 |
| 1,050,220 A * | 1/1913 | Link | ..................... | A01M 23/10 43/71 |
| 1,489,983 A * | 4/1924 | Dale | ..................... | A01M 23/20 43/70 |
| 2,619,765 A * | 12/1952 | Sees | ..................... | A01M 23/12 43/64 |
| 3,528,191 A * | 9/1970 | Hand | ..................... | A01M 23/10 43/64 |
| 4,845,887 A * | 7/1989 | Snyder | ..................... | A01M 23/04 43/69 |
| 5,517,784 A * | 5/1996 | Sedore | ..................... | A01M 23/04 43/64 |
| 5,528,852 A * | 6/1996 | Sarff | ..................... | A01M 23/10 43/64 |
| 5,996,274 A * | 12/1999 | Smith | ..................... | A01M 23/10 43/64 |
| 6,212,819 B1 * | 4/2001 | Edwards | ..................... | A01M 23/10 43/71 |
| 7,627,981 B1 * | 12/2009 | Doster | ..................... | A01M 23/10 242/599.1 |
| 2010/0132244 A1 * | 6/2010 | Ridge | ..................... | A01M 23/10 43/71 |
| 2016/0330949 A1 * | 11/2016 | Chism | ..................... | A01M 23/10 |
| 2018/0184641 A1 * | 7/2018 | Moga | ..................... | A01M 23/10 |

FOREIGN PATENT DOCUMENTS

CA 2370335 A1 * 7/2003 ............ A01M 23/10
RU 2050135 C1 * 12/1995

* cited by examiner

Primary Examiner — Darren W Ark
(74) Attorney, Agent, or Firm — Cramer Patent & Design, PLLC; Aaron R. Cramer

(57) ABSTRACT

A rodent trap includes a hollow tube supported through an axle with each opposing end of the axle secured within opposite diameter ends of a bucket opening. A bait is secured about the tube and a liquid is placed within the bucket. The trap is configured to entice a mouse or similarly sized animal onto the tube by means of the bait. Upon traversing the tube to obtain the bait, the tube freely spins depositing the mouse or animal into the liquid contained in the bucket, drowning the mouse or animal therein.

2 Claims, 4 Drawing Sheets

RODENT TRAP

RELATED APPLICATIONS

Not applicable.

FIELD OF THE INVENTION

The present invention relates generally to rodent traps and, more particularly, to rodent traps that assist in enticing rodents to engage with the trap, preventing the escape of rodents contained by the trap, and terminating entrapped rodents.

BACKGROUND OF THE INVENTION

Rats, mice and other rodents are persistent problems in almost all areas of the world. To control such pests, people have resorted to a wide variety of methods, tools, and traps to eradicate them. While a common mouse trap does function, it is a one-time, or single-use, tool, and once used, or even just tripped, requires the user to reset it and/or rebait it. Such use also exposes the user to contact with the trap and perhaps even the rodent where rodent germs are present. Other methods involve the use of poisoned bait, but such methods are unsuitable and even hazardous should children or pets be present. Additionally, the rodent may travel off away from the trap location where it may die in an inaccessible space, resulting in odors as it decays forcing the user to once again retrieve it and touch it, even if possible.

Accordingly, there exists a need for a means by which rodents can be trapped and killed without the disadvantages of present methods as described above.

SUMMARY OF THE INVENTION

The inventor has recognized the aforementioned, inherent problems and lack in the art and observed that there is a need for a rodent trap that is reusable and reduces, or eliminates, the user's contact with the entrapped rodent. The development of the present invention, which will be described in greater detail herein, fulfills this need.

In an embodiment, the disclosed apparatus includes a container including an open top and a top edge extending about a perimeter of said open top. The apparatus also includes a pair of retaining features formed in the container at laterally opposed locations. The apparatus also includes a rotating assembly including ends supported by the pair of retaining features and laterally extending across the open top of the container. The rotating assembly is configured to rotate about an axis of rotation relative to the container in response to a torque.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
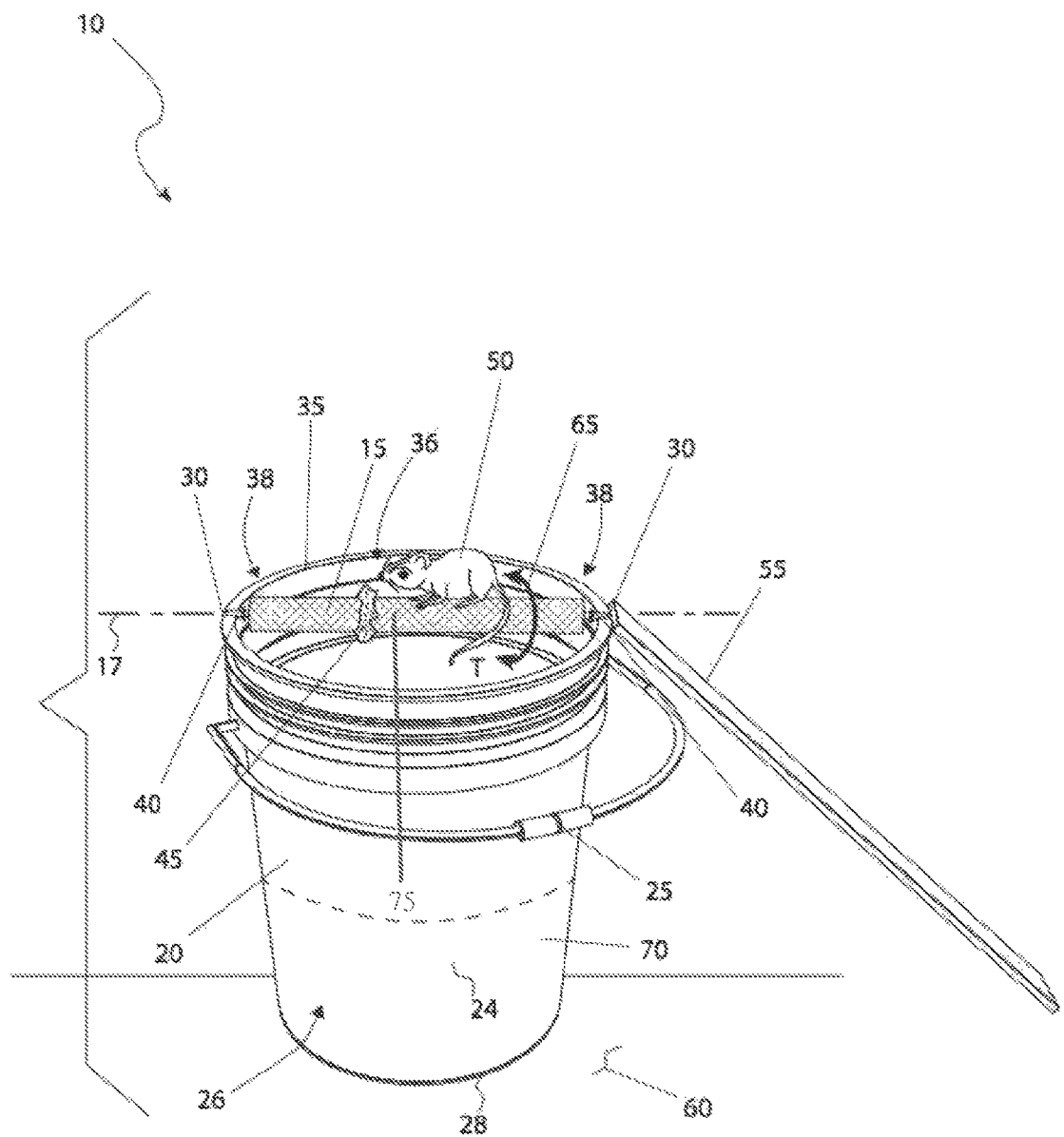
FIG. 1 is a schematic environmental perspective view of an embodiment of the disclosed rodent trap.

DESCRIPTIVE KEY 10 rodent trap ("apparatus")
15 rotatable cylinder
16 end of rotatable cylinder
17 axis of rotation
18 rotating assembly
20 bucket
22 retaining feature
24 side wall
25 handle
26 container
28 bottom wall
30 notches
32 first angled edge
34 second angled edge
35 top edge
36 open top
38 end of rotating assembly
40 axle
42 axle-end portion
45 viscous bait
50 rodent
55 access aid
60 grade level
65 travel path T
70 water
75 outer surface
80 diamond pattern embossed texture
85 plastic bushing
86 bearing
90 O-ring
95 friction bearing junction
100 vertical alignment V
105 rodent hind quarters
110 offset alignment O
115 turning motion

DETAILED DESCRIPTION OF THE PREFERRED EMBODIMENT

In accordance with the invention, the best mode is presented in terms of example embodiments, herein depicted within FIGS. 1-4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

The terms "a" and "an" herein do not denote a limitation of quantity, but rather denote the presence of at least one (1) of the referenced items.

Referring to FIGS. 1-4, disclosed is a rodent trap (herein generally referred to as the "apparatus") 10, where like reference numerals represent similar or like parts. The disclosed apparatus 10 generally includes a hollow tube supported through an axle with each opposing end of the axle secured within opposite diameter ends of a bucket opening. A bait is secured about the tube and a liquid is placed within the bucket. The trap is configured to entice a mouse, or similarly sized animal, onto the tube by means of the bait. Upon traversing the tube to obtain the bait, the tube freely spins depositing the mouse, or animal, into the liquid contained in the bucket, drowning the mouse, or animal, therein.

Figure 2:
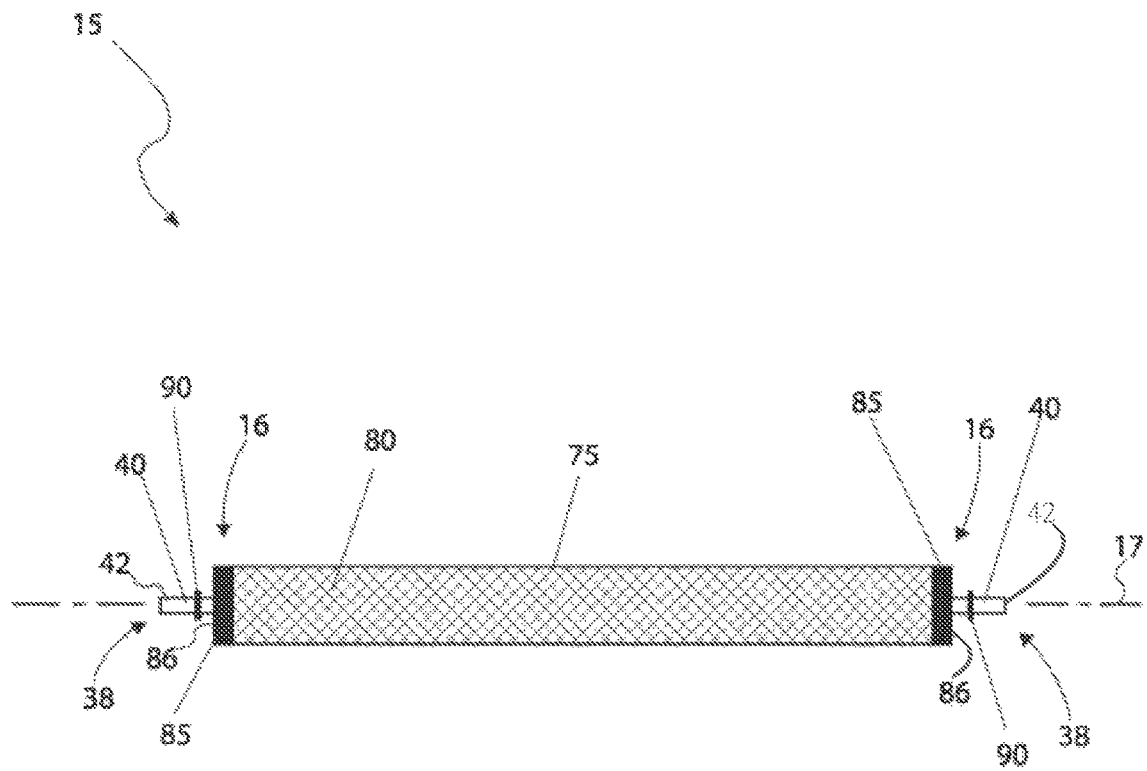
FIG. 2 is a schematic front elevation view of an embodiment of a rotatable cylinder of the disclosed rodent trap.

Referring to FIGS. 1 and 2, an embodiment of the disclosed apparatus 10 includes a rotatable cylinder 15 placed atop a bucket 20. In an example, the bucket 20 includes a side wall 24 (e.g., a continuous side wall) having a generally cylindrical shape (e.g., the bucket 20 has an approximately circular cross-sectional shape), a flat bottom wall, and a top opening that define an open interior volume. As an example, the bucket 20 is a five-gallon (5 Gal) bucket, such as those commonly found in home improvement stores. In other examples, the bucket 20 may be any other size and/or shape.

The bucket 20 may be made of high-density polyethylene (HDPE) plastic, aluminum, or any other suitable material.

In an example, the bucket 20 may also include a handle 25, for example, connected (e.g., rotatably connected) to the side wall 24 of the bucket 20. However, in other examples, the bucket 20 may not include the handle 25.

An embodiment of the bucket 20 includes two (2) retaining features 22 formed in the bucket 22 proximate to a top edge 35 (e.g., perimeter edge of the top opening) of the bucket 20. The retaining features 22 are located at one hundred eighty degrees (180°) relative to each other (e.g., are directly opposite each other).

Figure 3:
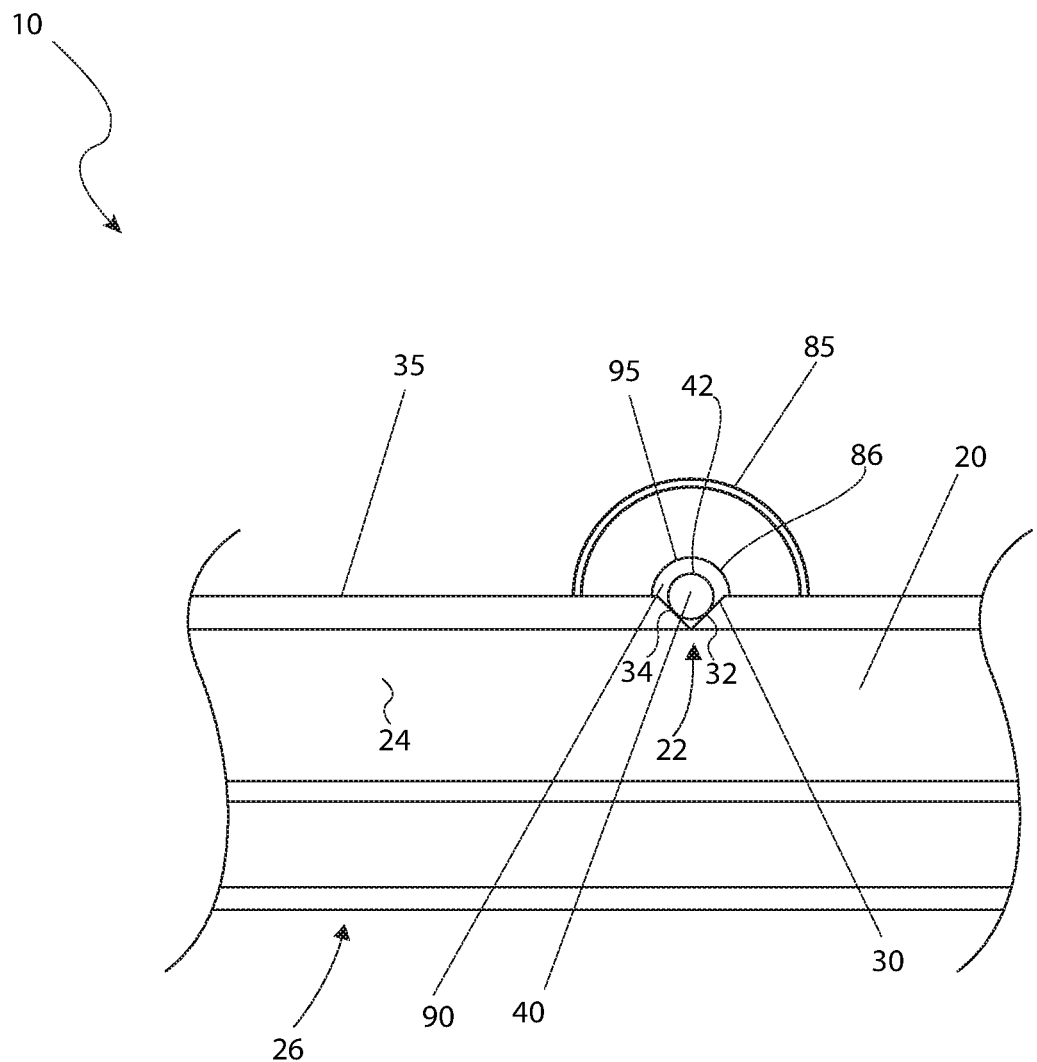
FIG. 3 is a schematic partial side elevation view of an embodiment of the rotatable cylinder engaged with a bucket of the disclosed rodent trap; and, FIG. 4 is a schematic environmental side elevation view of an embodiment of the rotatable cylinder, with a rodent positioned on the rotatable cylinder.

In an example, and as illustrated in FIG. 3, the retaining features 22 include notches 30 formed in the top edge 35 of the bucket 20. As an example, the notches 30 may have a triangular shape in side view. As an example, the notches 30 may be formed by a first angled edge 32 of the side wall 24 extending downward from the top edge 35 of the bucket 20 and a second angled edge 34 of the side wall 24 extending downward from the top edge 35 of the bucket 20 and intersecting the first angled edge 32. In an example, the first angled edge 32 and the second angled edge 34 are disposed at an approximately 45-degree angle relative to the top edge 35 of the bucket 20. However, other angular orientations (e.g., between approximately 30-degrees and 60-degrees) of the first angled edge 32 and the second angled edge 34 are also contemplated.

In another example (not illustrated), the notches 30 may have other geometric shapes in side view. As an example, the notches 30 may have a semi-circular shape in side view.

In another example (not illustrated), the retaining features 22 includes holes formed through the side wall 24 of the bucket 20 proximate to (e.g., at or near) the top edge 35 of the bucket 20.

In an example, the retaining features 22 (e.g., the notches 30 or the holes) are formed in the bucket 20 during fabrication of the bucket 20. In another example, the retaining features 22 (e.g., the notches 30) may be formed by the user in the top edge 35 of a commercially available bucket 20, such as with a sharp tool (e.g., a knife). In another example, the retaining features 22 (e.g., the holes) may be formed by the user in the side wall 24 of the bucket 20 proximate to the top edge 35 of a commercially available bucket 20, such as with a power tool (e.g., a drill).

Referring to FIGS. 1-3, an embodiment of the rotatable cylinder 15 includes an axle 40. In an example, the axle 40 extends along a longitudinal center line of the rotatable cylinder 15 and axle-end portions 42 of the axle 40 project outward from opposing ends 16 of the rotatable cylinder 15. The axle-end portions 42 of the axle 40 are configured to be rotatably connected to and supported by the retaining features 22. As an example, each of the axle-end portions 42 of the axle 40 is configured to sit within a corresponding one of the retaining features 22 (e.g., the notches 30). In this example, the axle 40 remains in place within the retaining features 22 (e.g., the notches 30) via gravity and friction. As another example, the axle-end portions 42 of the axle 40 are inserted through the retaining features 22 (e.g., holes or apertures) instead of resting within the retaining features 22 (e.g., the notches 30).

In an example, the rotatable cylinder 15 is suitably sized to fit within the top opening of the bucket 20. As an example, the rotatable cylinder 15 has a length suitable to extend across the top opening of the bucket 20 between opposed locations on the top edge 35 of the bucket 20. As a specific example, the rotatable cylinder 15 is suitably sized to fit within and be used with a standard size five-gallon bucket 20. However, it is envisioned that other sized buckets 20 along with rotatable cylinder 15 of appropriate (shorter or longer) lengths could be utilized with equal effectiveness, and as such, the use of any particular sized bucket 20 should not be interpreted as a limiting factor.

Referring to FIG. 1, an outer surface 75 of the rotatable cylinder 15 is configured for placement of viscous bait 45. As an example, an amount of the viscous bait 45, such as peanut butter, liquid cheese, cream cheese, butter, jelly or the like, is placed around the perimeter of the rotatable cylinder 15. In an example, the viscous bait 45 is positioned at an approximate midpoint, or longitudinal center, of the rotatable cylinder 15. The viscous bait 45 remains in place about the three hundred sixty-degree (360°) perimeter due to its adhesive, or "sticky," quality.

A rodent 50, such as a mouse, rat, or the like, gains access to the rotatable cylinder 15 and the viscous bait 45 by either an access aid 55, such as a board, plank, stick, pipe, or the like, or by jumping from a grade level 60 upon being lured from the scent of the viscous bait 45. While feeding upon the viscous bait 45, a change in the center of gravity of the rodent 50 will result in the rotatable cylinder 15 turning as defined by a travel path T 65 and falling into the bottom of the bucket 20. In an example implementation, the bucket 20 is filled with approximately three (3) to four (4) inches of water 70 (shown by a hidden line in FIG. 1).

Additional details with respect to changes in center of gravity and subsequent rotation of the rotatable cylinder 15 will be provided herein below. As the rodent 50 will float in the water 70, it will not be able to jump back up and out of the rotatable cylinder 15. After treading water 70 for a certain time limit, the rodent 50 will drown and perish.

Referring to FIGS. 1 and 2, the rotatable cylinder 15 may be manufactured from aluminum, plastic, or any other suitable material. In an example, the rotatable cylinder 15 has an approximate diameter of three-quarters (¾) of an inch and an approximate length of ten and thirteen sixteenths (10$^{13}$/$_{16}$) inches.

In an example, the outer surface 75 includes a diamond pattern embossed texture 80 configured to aid in traction when the rodent 50 walks upon the rotatable cylinder 15 (as shown in FIG. 1) as well as serve as an anchoring point for the viscous bait 45 (as shown in FIG. 1) to remain attached to the rotatable cylinder 15.

Referring to FIGS. 2 and 3, in an example, two (2) plastic bushings 85 are provided at (e.g., are connected to) each outward end 16 of the rotatable cylinder 15. As an example, the plastic bushings 85 are pressed into a hollow interior of the rotatable cylinder 15 formed by the outer surface 75 and are held in place via a friction fit or interference fit.

In an example, the plastic bushings 85 increase the length of the rotatable cylinder 15 to a new outer length of approximately eleven and one-eighth (11⅛) inches.

In an example, the axle-end portions 42 of the axle 40 extend outwardly from the bushings 85. In an example, the axle 40 is approximately three-sixteenths (³⁄₁₆) of an inch in diameter and twelve and a quarter (12¼) inches long. In an example, the axle 40 is centered about the plastic bushings 85.

A junction between the axle 40 and the plastic bushings 85 serves as a bearing 86 for the apparatus 10, which enables rotation of the rotatable cylinder 15 about the axle 40 to occur, as illustrated by the travel path T 65 (FIG. 1).

In an example, the rotatable cylinder 15 also includes at least one (1) O-ring 90 located on (e.g., connected to) the axle-end portions 42 of the axle 40 and allow for centering of the rotatable cylinder 15 about the interior of the bucket 20 (as shown in FIG. 1).

FIG. 3 illustrates an example of the retaining feature 22 in the form of the angled notches 30 located in the top edge 35 of the bucket 20. The axle-end portions 42 of the axle 40 sit in the angled notches 30 and the rotatable cylinder 15 is centered via the O-rings 90. In FIG. 3, the bushings 85 is visible beyond the O-rings 90 and serves as a support for the outer surface 75 (not visible in FIG. 3). A friction bearing junction 95, between the axle 40 and the bushing 85 is present, and will be described in greater detail herein below.

Figure 4:
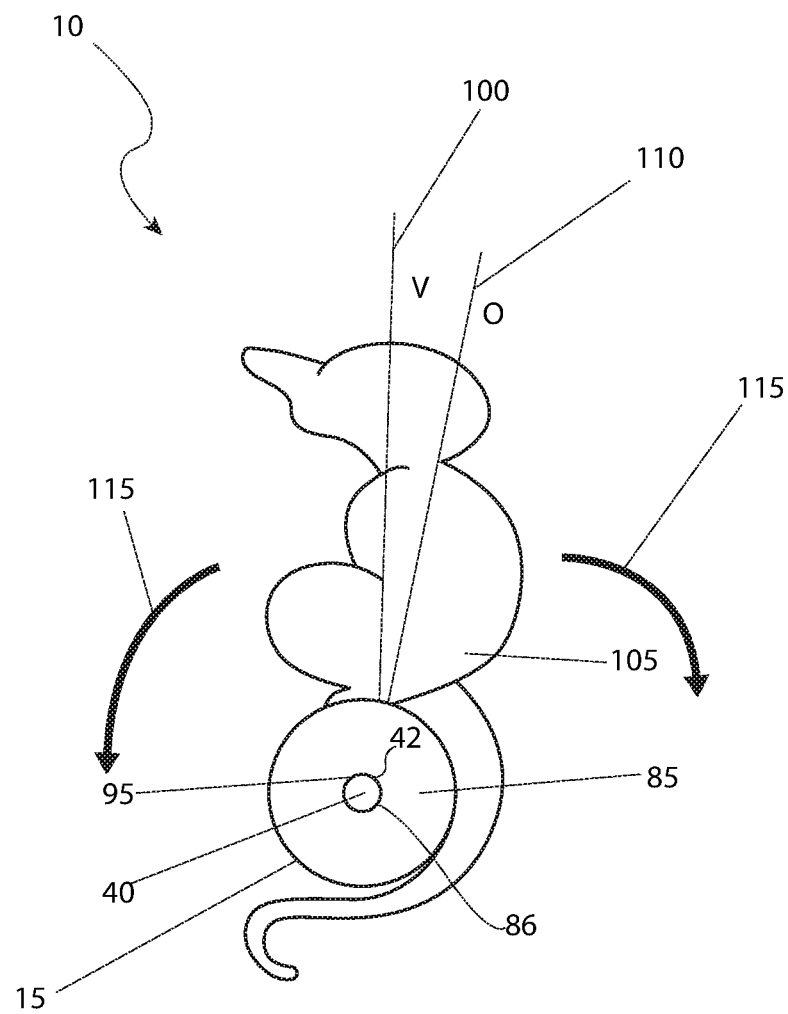

FIG. 4 depicts the relationship of the variance between the center of gravity of the rodent 50 and when the variance overcomes the friction present at the friction bearing junction 95 causing rotation and subsequent falling off of the rodent 50. Pertinent variables are defined as follows:

Torque=Force applied×lever arm. Average weight of rodent 50=one and a half (1½) ounces (oz). Torque=1.5 oz×0.375 in).

It should be noted that as the rodent 50 would eat the viscous bait 45 (FIG. 1), it would turn sideways and stand up (as shown in FIG. 4), versus the prone position (as shown in FIG. 1). This placement would greatly extend the force and thus torque provided the rodent 50 remains centered on the rotatable cylinder 15, the axle 40, and the friction bearing junction 95, as depicted by a vertical alignment V 100 (FIG. 4). However, it is expected that as the rodent 50 consumes the viscous bait 45, its weight will no longer be centered as the rodent hind quarters 105 extends over the rotatable cylinder 15 resulting in an offset alignment O 110 (FIG. 4), thus exerting torque on the rotatable cylinder 15 and thus the friction bearing junction 95 as well. It is envisioned that the resulting torque exerted onto the rotatable cylinder 15 is approximately 0.9 in/oz. This torque overcomes the friction present at the friction bearing junction 95. It is envisioned that the value of static friction present at the friction bearing junction 95 could be varied by the overall depth of the plastic bushings 85 thus allowing use of the rotatable cylinder 15 with larger rodent 50 such as rats. The examples provided by this disclosure simply indicate the parameters that can be varied to maintain a stable rotatable cylinder 15 to allow the rodent 50 to gain access to the viscous bait 45 (FIG. 1) and the subsequent turning motion 115 as the center of gravity varies.

Referring to FIGS. 1-4, in an embodiment, the disclosed apparatus 10 includes a container 26 comprising an open top 36 and a top edge 35 extending about a perimeter of the open top 36. The apparatus 10 also includes a pair of retaining features 22 formed in the container 26 at diametrically opposite locations on the top edge 35 of the container 26. The apparatus 10 also includes a rotating assembly 18 including ends 38 supported by the pair of retaining features 22. The rotating assembly 18 extends across a diameter of the container 26 (e.g., the bucket 20) from one location on the top edge 35 of the container 26 to a diametrically opposite location on the top edge 35 of the container 26. The rotating assembly 18 is configured to rotate about an axis of rotation 17 relative to the container 26 in response to a torque.

In an embodiment, the container 26 includes a bottom wall 28 and a side wall 24 extending upwardly from the bottom wall 28 to the open top 36. Each one of the pair of retaining features 22 is formed in the side wall 24 proximate to the top edge 35.

In an embodiment, the container 26 is a cylindrical bucket 20. As an example, the container 26 is a five-gallon bucket 20.

In an embodiment, each one of the pair of retaining features 22 includes a notch 30 formed in the side wall 24 and extending downwardly from the top edge 35. Each one of the ends 38 of the rotating assembly is configured to fit within the notch 30.

In an embodiment, the notch 30 includes a first angled edge 32 extending downwardly from the top edge 35 and a second angled edge 34 extending downwardly from the top edge 35 and intersecting the first angled edge 34.

In an embodiment, each of the first angled edge 32 and the second angled edge 34 is disposed at an approximately 45-degree angle relative to the top edge 35.

In an embodiment, the notch 30 has a triangular shape in side view.

In an embodiment, the notch 30 has a semi-circular shape in side view.

In an embodiment, each one of the pair of retaining features 22 includes an aperture formed in the side wall 24 proximate to the top edge 35. Each one of the ends 38 of the rotating assembly 18 is configured to be received by the aperture.

In an embodiment, the rotating assembly 18 includes a rotatable cylinder 15 and an axle 40 extending outwardly from ends 16 of the rotatable cylinder 15 and configured to be connected to the pair of retaining features 22.

In an embodiment, the axle 40 is configured to rotate within the pair of retaining features 22 about the axis of rotation 17 relative to the container 26.

In an embodiment, the axle 40 is substantially rotationally fixed relative to the container 26. The rotatable cylinder 15 is configured to rotate about the axis of rotation 17 relative to the axle 40.

In an embodiment, the axle 40 extends through the rotatable cylinder 15. Axle-end portions 42 of the axle 40 are configured to be connected to the pair of retaining features 22.

In an embodiment, the rotating assembly 18 also includes bearings 86 positioned between the rotatable cylinder 15 and the axle 40.

In an embodiment, the bearings 86 include friction bearings 95 configured to restrict rotation of the rotatable cylinder 15 relative to the axle 40 until the torque reaches a predetermined magnitude.

In an embodiment, the axle 40 includes axle-end portions 42 configured to be connected to the ends 16 of the rotatable cylinder 15. A length of the rotating assembly 18 is adjustable by selectively positioning at least one of the axle-end portions 42 relative to the rotatable cylinder 15.

In an embodiment, the rotating assembly 18 also includes bushings 85 connected to the ends 16 of the rotatable cylinder 15. Each of the axle-end portions 42 is linearly movably connected to an associated one of the bushings 85. The rotating assembly 18 also includes bearings 86 positioned between the bushings 85 and the axle-end portions 42.

The bearings 86 include friction bearings 95 configured to restrict rotation of the rotatable cylinder 15 relative to the axle-end portions 42 until the torque reaches a predetermined magnitude.

In an embodiment, the rotating assembly 18 also includes O-rings 90 connected to axle-end portions 42 of the axle 40, extending co-axially from the ends 16 of the rotatable cylinder 15. The O-rings 90 are configured to engage the container 26 to laterally center the rotatable cylinder 15 within the open top 36.

In an embodiment, the rotatable cylinder 15 includes an outer surface 75 having a diamond pattern embossed texture 80.

In an embodiment, the apparatus 10 also includes an access aid 55 configured to be connected to the top edge 35 of the container 26 and aligned with the rotating assembly 18. The access aid 55 extends from the open top 36 to a grade level 60.

It is envisioned that other styles and configurations of the disclosed apparatus 10 can be easily incorporated into the teachings of the present disclosure, and only one certain configurations have been shown and described for purposes of clarity and disclosure and not by way of limitation of scope.

Examples of the disclosed apparatus 10 can be utilized by the common user in a simple and effortless manner with little or no training. It is envisioned that the apparatus 10 would be constructed in general accordance with FIGS. 1-4. After initial purchase or acquisition of the apparatus 10, it would be configured and utilized as indicated in FIGS. 1-4.

Configuring and utilizing the apparatus 10 may be achieved by performing a series of steps. It can be appreciated that the operational steps may be performed in alternative order and as such any operational description of use should not be viewed as limiting in scope. In an example method, the user would obtain the rotatable cylinder 15 and the bucket 20 either as a unit or purchased separately. Preparation of the apparatus 10 would proceed as follows: first, provide the first of two (2) angled notches 30 in the top edge 35 of the bucket 20; provide the second of two (2) angled notches 30 in the top edge 35 of the bucket 20 at a point one hundred eighty degrees (180°) opposite of the first; remove the axle 40 from the rotatable cylinder 15 and apply a lubricant such as shortening or petroleum jelly; reinsert the axle 40 and apply the O-rings 90 ensuring that it is centered; apply the viscous bait 45 at the midpoint of the rotatable cylinder 15 providing one hundred eighty degrees 180° coverage; position the axle 40 in the previously made angled notches 30; add three to four inches (3-4 in.) of water 70 in the bottom of the bucket 20; and place the apparatus 10 in a desired location where rodent 50 are known to frequent. Finally, make sure the rotatable cylinder 15 is centered on the bucket 20 and is free to rotate. At this point in time, the apparatus 10 is ready for use.

During use, it is necessary to frequently check the rotatable cylinder 15 and remove any dead rodent 50 by simply pouring the contents of the bucket 20 into a toilet and flushing it, thus negating the necessity of touching the rodent 50. Such frequency of checking is envisioned to be approximately every two (2) days. More frequent checking and disposal is envisioned to enhance the ability of trapping other rodents 50. After emptying, the bucket 20 is refilled with water 70, and additional viscous bait 45 applied to the rotatable cylinder 15 thus resetting the apparatus 10 for continuous use in a cyclical manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

The invention claimed is:

1. An apparatus, comprising:
 a container having an open top and a top edge extending about a perimeter of said open top;
 a pair of retaining features formed in said container at each of a pair of diametrically opposite locations on said top edge of said container;
 a rotating assembly having a circumferential outer surface and opposed ends that are supported by said pair of retaining features, said container includes a bottom wall and a side wall extending upwardly from said bottom wall to said top edge, each retaining feature of said pair of retaining features is formed in said top edge and said side wall, each retaining feature of the pair of retaining features includes a notch formed in said top edge and said side wall which extends downwardly from said top edge toward said bottom wall, said notch includes a first angled edge extending downwardly from said top edge and a second angled edge extending downwardly from said top edge and intersecting said first angled edge, each end of said ends of said rotating assembly fit within said notch, each of said first angled edge and said second angled edge is disposed at a 45-degree angle relative to said top edge;
 said rotating assembly laterally extending across said open top of said container from one of the diametrically opposite locations to another of the diametrically opposite locations on said top edge of said container, wherein said rotating assembly rotates about an axis of rotation relative to said container in response to a torque, and said rotating assembly includes a diamond pattern texture formed on said circumferential outer surface to increase friction of said circumferential outer surface of said rotating assembly and provide traction for a rodent traversing said rotating assembly, wherein said rotating assembly further comprises O-rings connected to axle-end portions of an axle, extending coaxially from a pair of ends of a rotatable cylinder and terminating at opposing axle ends of said axle which comprise said opposed ends of said rotating assembly, each of said axle ends disposed in opposing relation from where said axle-end portions extend from a respective end of said pair of ends of said rotatable cylinder, each of said O-rings located between a respective axle end of said axle ends and a respective end of said of said pair of ends of said rotatable cylinder so as to be spaced a distance from each of said respective axle end of said axle ends and said respective end of said pair of ends of said rotatable cylinder, and said O-rings engage said container to laterally center said rotatable cylinder within said open top, said axle-end portions are connected to said container by being placed within said pair of retaining features, wherein said axle extends through said rotatable cylinder, and wherein said rotating assembly includes bearings positioned between said rotatable cylinder and said axle, said rotatable cylinder rotating about said axis of rotation relative to said axle, said bearings include a plurality of friction bearings to restrict rotation of said rotatable cylinder relative to said axle until said torque reaches a predetermined magnitude; and an access aid to be connected to said top edge of said container and aligned with said rotating assembly, wherein said access aid extends from said open top to a grade level.

2. The apparatus of claim 1, wherein said container is a cylindrical bucket.

\* \* \* \* \*